July 21, 1970 J. B. MURPHY 3,521,045

APPARATUS FOR SIMULATING BLOOD-ALCOHOL CONTENT

Filed March 7, 1968 2 Sheets-Sheet 1

INVENTOR:
John Brian Murphy
By Smyth, Roston & Pavitt
ATTORNEYS

APPARATUS FOR SIMULATING BLOOD-ALCOHOL CONTENT

Filed March 7, 1968 2 Sheets-Sheet 2

INVENTOR:
John Brian Murphy
By Smyth, Roston & Pavitt
ATTORNEYS

United States Patent Office 3,521,045
Patented July 21, 1970

3,521,045

APPARATUS FOR SIMULATING BLOOD-ALCOHOL CONTENT

John Brian Murphy, Culver City, Calif., assignor to The Bissett-Berman Corporation, Santa Monica, Calif., a corporation of California Filed Mar. 7, 1968, Ser. No. 711,312
Int. Cl. G06g 7/60; B01k 3/00
U.S. Cl. 235—184 17 Claims

ABSTRACT OF THE DISCLOSURE

The present invention is directed to apparatus such as a computer for simulating the amount of alcohol in blood over a progressive period of time or a drunkometer for monitoring on a simulated basis the alcohol in the bloodstream of a drinker. The simulator or computer includes a storage device, such as an electrochemical storage element, for receiving and storing on a particular electrode active material representative of the percentage of alcohol in the bloodstream of the drinking man. The computer also includes means for controlling the storage of the active material on the particular electrode in the storage element and specifically includes means for controlling the storage in accordance with factors such as the weight of the drinking man and the proof of the alcohol. In addition, the computer includes means for progressively removing the active material from the particular electrode of the storage element in accordance with the rate at which alcohol is lost from the bloodstream. Finally, the computer includes an output indicator for producing an output indication when the storage element indicates that the drinker has at least a predetermined percentage of alcohol in the bloodstream. Other aspects of the invention include the use of a pair of electrochemical storage elements in series so that as active material is stored on the particular electrode in one of the storage elements it is correspondingly removed from the particular electrode of the other storage element. In this manner, a quantity of active material in representation of a predetermined level of alcohol in the bloodstream, which predetermined level indicates that the drinking man is drunk, is present in the computer during the time that the drinker would actually be drunk.

The question of drunkenness becomes an ever-increasing problem due to the development of the automobile as the primary mode of transportation. The cliche "drinking and driving do not mix" becomes a terrifying reality as the "slaughter on the nation's highways" increases. The present invention is directed to a device to warn a drinker about impending drunkennness and actual drunkenness and to provide this warning to the drinker until the drunkenness of the drinker has receded below a particular level.

The present invention is directed to a drinking man's computer which accomplishes the above described warning function. Specifically, the invention includes a computing and storage device which is fed information in accordance with the quantity of alcohol which is consumed by the drinker, the proof of that alcohol which is consumed, and the weight of the drinker. After the initial information is entered, the drinking man's computer provides an output indication to the drinking man as to the relative concentration of alcohol in his blood and continuously computes the change in the level of drunkenness. Specifically, the simulator or computer provides at least an output indication to the drinking man when the percentage of alcohol in the bloodstream exceeds a predetermined level.

In the United States the generally accepted legal definition of drunkenness is a condition of 0.15% blood alcohol. In reality, the physical reflexes of an individual are impaired at a much lower level of alcohol in the bloodstream. The present invention can be set to any particular level, but, in accordance with this generally accepted legal definition, the present invention will be described with reference to this level of 0.15% blood alcohol.

An interesting phenomena in the human body's chemical reaction to alcohol is that, although the concentration of alcohol in the bloodstream as a result of consuming a given amount of alcohol is generally in accordance with the weight of the drinker, the amount of alcohol which is lost or dissipated from the bloodstream is essentially at a constant rate, regardless of the weight of the drinker. Specifically, alcohol is lost or dissipated from the bloodstream at the rate of 0.016% per hour. On the other hand, the rate at which alcohol is added to the bloodstream is, for example, approximately 0.02% for each ounce of 86-proof liquor for a male weighing 165 pounds and it requires approximately one hour to reach a peak level of blood alcohol.

The present invention, therefore, provides a computer which causes active material to be stored on a particular electrode in a storage device in accordance with the weight of the drinker, the proof of the alcohol consumed and the quantity of the alcohol consumed. The information is stored immediately and in an excess fashion so as always to indicate that the drinker is slightly more drunk than the drinker really is. The present invention also includes means in the computer for removing this active material from the particular electrode in the storage device at a substantially constant rate, which rate is equivalent to the loss of alcohol from the blood stream at a rate of 0.016% per hour. The computer, therefore, operates by initially storing active material on the particular electrode in a step fashion in accordance with the factors indicated above and the active material is then removed from the particular electrode at a constant rate. This type of storage and removal of information approximates the actual conditions occurring in the bloodstream of the drinker, and any error of the computer is in the direction to indicate that the drinker is drunker than he really is.

The storage element may constitute an electrochemical storage cell which includes a pair of electrodes and contains an active material for transfer between the electrodes. The storage element initially includes a charge of active material on one of the electrodes, which charge is equivalent to a particular concentration of alcohol in the bloodstream of the drinker to correspond to the level of alcohol that would make the drinker drunk. At this time, the computer produces an output indication which indicates that the drinking man has not been drinking in any manner that would make the drinker drunk.

When the drinking man takes a drink, he activates a mechanism which causes a particular amount of the active material present on the one electrode to be transferred to the other electrode in accordance with such activation. The particular amount of active material which is transferred is in accordance with the quantity of the alcohol, the proof of the alcohol and the weight of the drinking man. The computer then immediately starts to transfer at a substantially constant rate the active material back to the one electrode. Specifically, the rate at which the electrochemical storage cell is recharged is in accordance with the normal rate at which alcohol is lost from the bloodstream, which rate is equal to approximately 0.016% per hour. Each time the drinker consumes a drink, he discharges a particular amount of the active material present on the one electrode. If the drinker consumes a sufficient amount of alcohol, the electrochemical storage element ultimately has all of the active material transferred from the one electrode to the other electrode. When all of the active material is transferred from the one electrode, the computer produces an output indication that the drinker has consumed alcohol to excess and that, at least on a simulated basis, the drinker is drunk.

As a refinement on the system described above, the storage element may include a pair of electrochemical storage cells, with the cells connected in series and with the first storage cell including the predetermined amount of active material on a particular one of its electrodes. As the active material on this electrode in the first electrochemical storage cell is transferred to the other electrode active material in the second electrochemical storage element is correspondingly transferred from the other electrode to the particular electrode. In this way, the transfer of the active material from the particular electrode of the first electrochemical storage element acts to produce a transfer of the same quantity of active material to the particular electrode within the second electrochemical storage element. The predetermined quantity of active material which is initially provided on the particular electrode of the first electrochemical storage element may, therefore, be considered as being transferred back and forth between the pair of electrochemical storage elements even though each storage element is a separate entity.

In addition to the above, the particular example of the drinking man's computer of the present invention may also include a third electrochemical storage element which is only operable when all of the predetermined quantity of active material is discharged from the one electrode of the first electrochemical storage element. The third electrochemical storage element may be used to provide the output indication and the third electrochemical storage element may be used as an over-timer so that the third electrochemical storage element must be discharged before the first electrochemical storage element can be again charged.

The particular electrochemical storage elements may be of the type described in copending application Ser. No. 519,634, filed on Jan. 10, 1966 (now Pat. 3,423,648, issued on Jan. 2, 1969), in the name of Martin Mintz and assigned to the same assignee as the instant application.

A clearer understanding of the present invention will be had with reference to the following description and drawing wherein.

Figure 1:
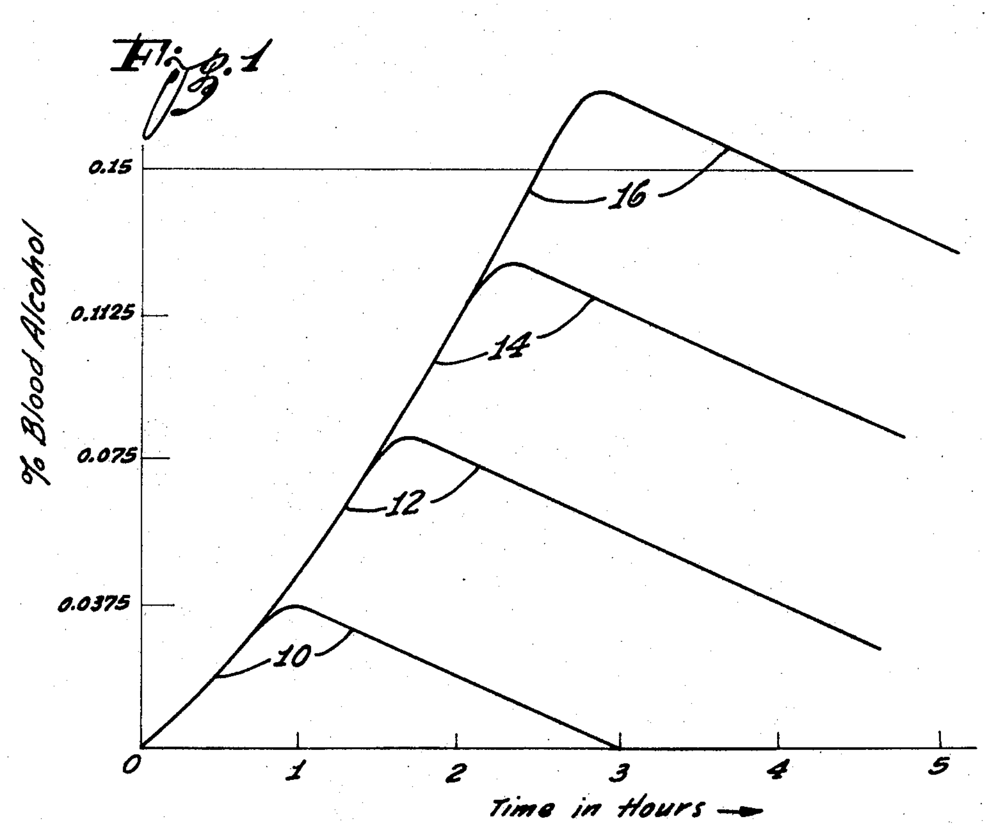
FIG. 1 illustrates a series of curves showing the percentage of alcohol in the bloodstream of a typical drinker over a period of time.

In FIG. 1, a series of curves are plotted showing the percentage of blood alcohol versus time in hours. The value of 0.15% is generally the legally accepted level to indicate drunkenness. The curves are not plotted with regard to any particular quantity or proof of alcohol, nor are the curves plotted in regard to any particular weight for the drinker, but the curves are plotted as representative of a general class of curves. As can be seen in FIG. 1, it is assumed that a first drink is consumed at 0 time and the curve of the percent of blood alcohol versus time in hours is shown in curve 10. As can be seen by curve 10 of FIG. 1, the percent of blood alcohol rises at a first rate to reach a peak in one hour and then declines at a lesser rate. Specifically as indicated above, the rate at which the alcohol is lost from the blood is relatively constant for all people and this rate is approximately 0.016% per hour.

As can be seen by curve 10 of FIG. 1, all of the alcohol would be lost from the bloodstream after the first drink in approximately three hours, assuming no other drinks are consumed. In the illustration of FIG. 1, however, it is assumed that every 40 minutes a drink is consumed and that each drink is of the same character and contains the same proof and quantity of alcohol as the first drink. The effect of the second drink is shown by the curve 12. As can be seen by curve 12 of FIG. 1, the effect of the second drink is to add an increasing amount of alcohol to the bloodstream until a peak is reached in approximately one hour and 40 minutes from the initial time. The percent of blood alcohol then declines at the same constant rate as for curve 10 of FIG. 1.

Assuming that a third drink is taken at the time of one hour and 20 minutes from the initial time, a third curve designated 14 occurs and a new peak is reached in approximately two hours and 20 minutes from the initial time. There have been three drinks consumed in one hour and 20 minutes, but the drinker has not yet reached a percent of blood alcohol which would be legally considered to constitute a condition of drunkenness. However, as shown by a curve 16 of FIG. 1, the fourth drink which is taken at two hours after the initial time, produces a level of blood alcohol in approximately two and one-half hours after the initial time, which level would legally constitute a state of drunkenness for the drinker.

It is to be appreciated that the level of 0.15% is relatively high and that actually the reflexes of the drinker would be impaired at a much lower level. As can be seen in FIG. 1, assuming that the fourth drink is taken and the curve such as curve 16 ensues, the state of drunkenness would persist for approximately one and one-half hours, or until approximately four hours after the initial drinking has begun. The present device approximates the curves as shown in FIG. 1 and includes an improvement in that an output indication of drunkenness is shown immediately after the consumption of the fourth drink, even though the legal state of drunkenness might not occur for another half hour or so.

Figure 2:
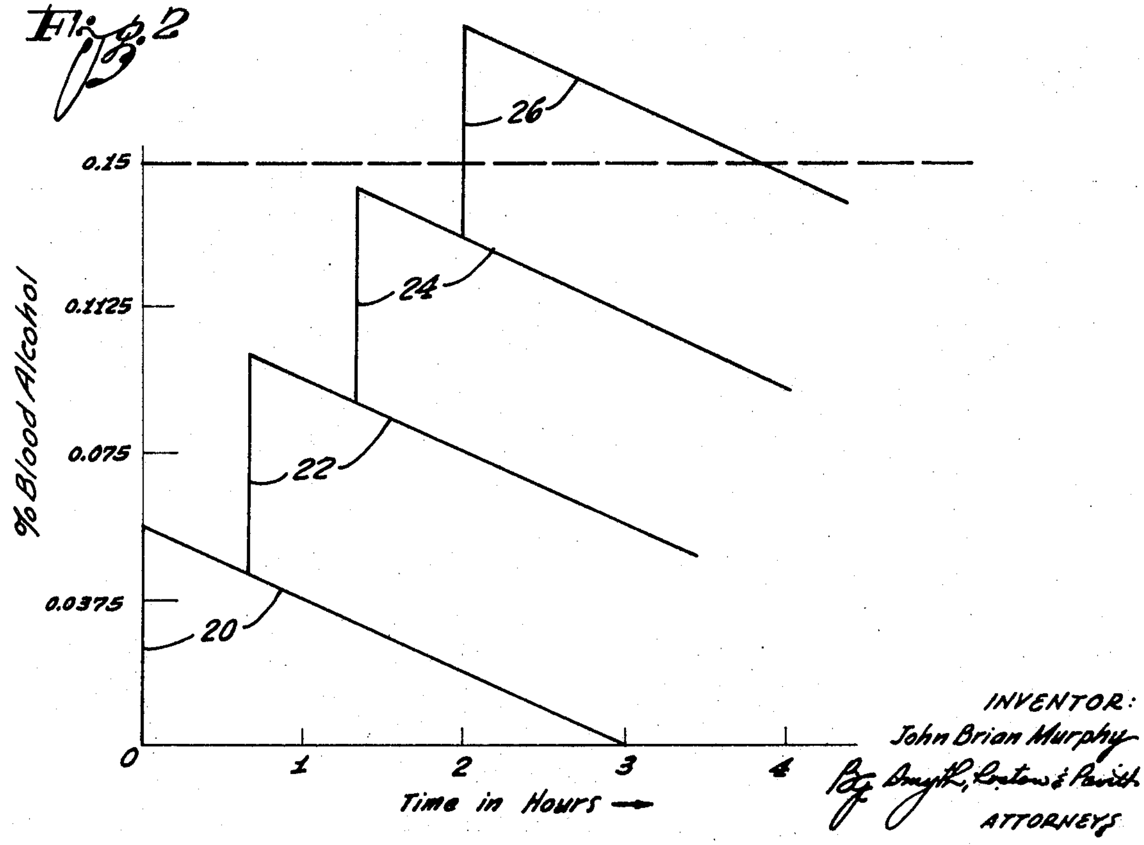
FIG. 2 illustrates a series of curves which indicate the manner in which the computer of the present invention approximates the curves of FIG. 1.

In FIG. 2, the approximation of the curves of FIG. 1 as produced by the present invention is shown. In FIG. 2, the percent of blood alcohol is plotted against time in hours. When the first drink is taken, a curve such as curve 20 of FIG. 2 is produced. Curve 20 has an immediate rise to a particular level, which level is in accordance with the quantity of alcohol, the proof of the alcohol and the weight of the drinker. It is assumed that the above factors are similar for both FIGS. 1 and 2. The curve 20 then decreases at a constant rate, which rate is equivalent to the loss of alcohol from the blood at the rate of 0.016% per hour. After one hour, the level shown by the curve 20 is approximately the same for the peak value of the curve 10 shown in FIG. 1.

The second drink after 40 minutes produces the curve 22, which is similar to the curve 20, and shows a step increase and then a decrease at a constant rate. The third drink at one hour and 20 minutes from the start produces the curve 24 and the fourth drink at 2 hours, as shown by the curve 26, produces an immediate indication of drunkenness. The present invention, therefore, indicates a condition of drunkenness approximately one-half hour before the actual state of legal drunkenness occurs.

The present invention, therefore, produces a warning beforehand that the drinker is reaching a state of inebriation. Also, as shown in FIG. 2, the state of drunkenness is indicated until approximately 4 hours after the starting time, which time is similar to that shown in FIG. 1. The present invention, therefore, would indicate a state of drunkenness for a period of 2 hours for the particular example shown in FIG. 2.

Figure 3:
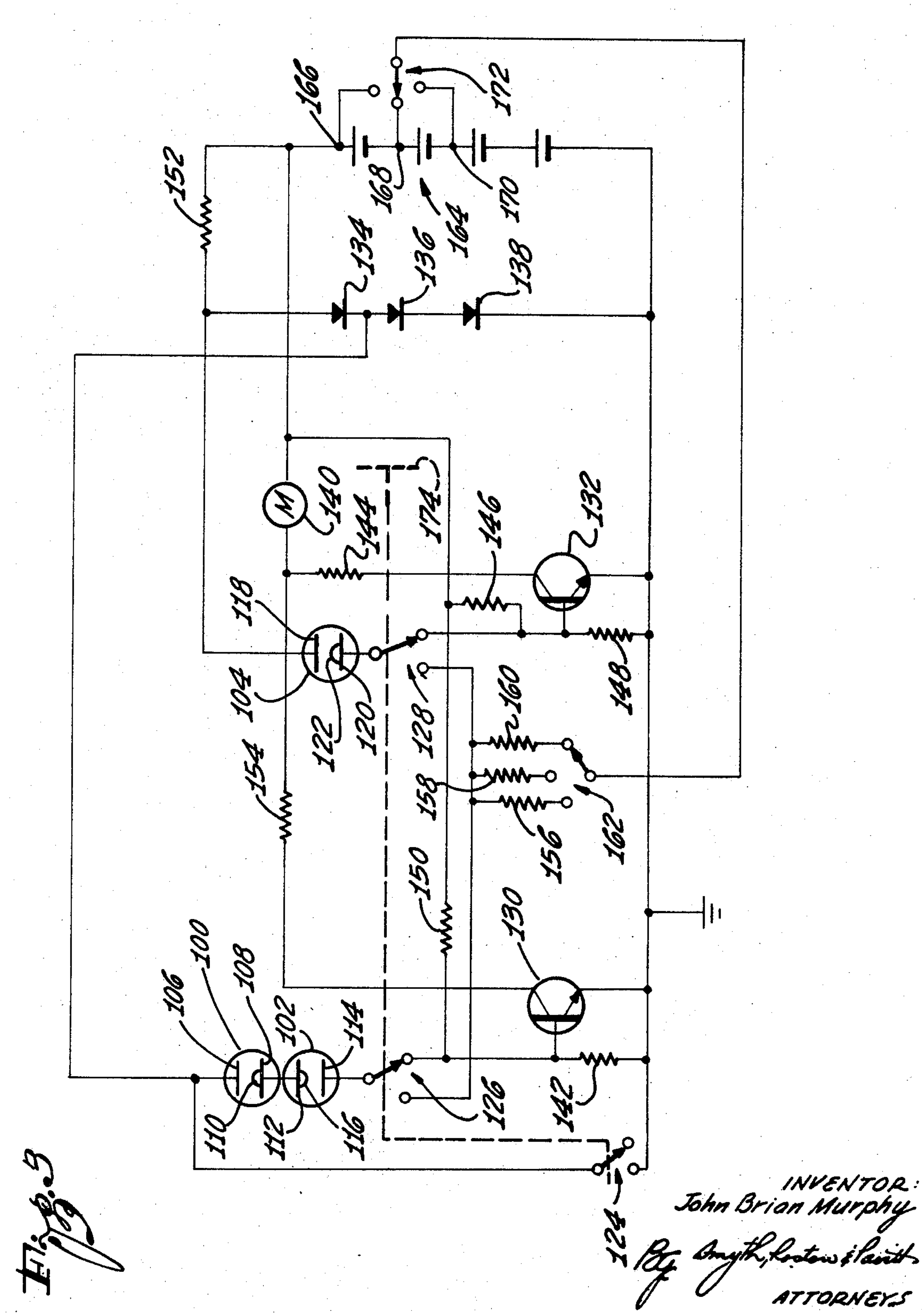
FIG. 3 is a schematic diagram of a drinking man's computer constructed in accordance with the teachings of the present invention.

A particular example of a computer which produces the conditions represented by the curves of FIG. 2 is present in the circuit diagram of FIG. 3. FIG. 3 includes three electrochemical storage elements 100, 102 and 104. The electrochemical storage elements 100 and 102 are in series and are connected in an opposite fashion so that as active material is transferred from a particular electrode in storage element 100, it is transferred to the particular electrode in element 102. Specifically, the electrochemical storage elements each include a pair of electrodes and contain active material for transfer between the electrodes. Specifically, storage element 100 includes electrodes 106 and 108 and contains active material 110. Storage element 102 includes electrodes 112 and 114 and contains active material 116. Storage element 104 includes electrodes 118 and 120 and contains active material 122.

In actuality, the storage elements may be electrochemical storage elements as shown in copending application Ser. No. 519,634 (now Pat. 3,423,648) filed on Jan. 10, 1966, in the name of Martin Mintz and assigned to the same assignee as the instant application. As can be seen in the copending application Ser. No. 519,634 (now Pat. 3,423,648), the electrochemical storage elements may include an outer electrode and an inner concentric electrode, which inner concentric electrode is coated with a layer of inert material. The outer electrode may be composed of or include a layer of active material and the active material may be transferred to and from the inner electrode. Specifically, the storage element 100 may have a particular amount of active material 110 precharged on the electrode 108, which particular amount of active material corresponds to a level of 0.15% alcohol in the bloodstream when all of this active material has been transferred to the electrode 106.

The circuit of FIG. 3 also includes switches 124, 126 and 128, which switches are ganged together. All three switches 124, 126 and 128 are single-pole double-throw switches. The circuit of FIG. 3 also includes transistors 130 and 132 and diodes 134, 136 and 138. A meter 140 is used to provide the output indication and the meter 140 may be of the type which is responsive to levels of current. Resistors 142 and 150 bias the transistor 130 to make the transistor conductive only for certain states of operation of the electrolytic cell 100. Similarly, resistors 146 and 148 bias the transistor 132 to make the transistor conductive only for certain states of operation of the electrolytic cell 104, and resistor 152 is used for biasing of the diode 134. The circuit also includes resistors 144 and 154 to limit the flow of current through the meter 140 to half of that which would otherwise flow through the meter.

Three resistors 156, 158 and 160 in combination with the switch 162 are used to set discrete values of resistance in representation of the proof of the alcohol which is consumed by the drinker. For example, the resistor 156 may have a relatively high value in representation of a proof of 86. The resistor 158 may have an intermediate value in representation of a proof of 100, and the resistor 160 may have a relatively low value in representation of a proof of 140. Finally, a voltage source 164 has a series of taps 166, 168 and 170 which taps are connected to fixed terminals of a switch 172. The various taps for the voltage source 164 may be switched to produce the proper operation of the computer in representation of different weight drinkers. Specifically, the value of the voltage at the tap 166 may be in representation of a weight for a drinker of less than 115 pounds since a high voltage produces a relatively large transfer of active material to indicate that a person of low weight will be more affected by each drink than a person of high weight. The value of the voltage at the tap 168 may be in representation of a weight for a drinker of between 115 and 165 pounds, and the value of the voltage at the tap 170 may be in representation of the weight for a drinker over 165 pounds. It is to be appreciated that since the computer of the present invention is designed to err in the direction of indicating a state of drunkenness prematurely, the specific weights of the drinker and proofs of the alcohol may merely be approximate. However, it is to be appreciated that the discrete values shown in FIG. 3 may be eliminated and a continuous adjustment may be provided for both the proof of the alcohol and the weight of the drinker.

In the operation of the device of FIG. 3, first the drinker sets the switch 172 to approximate his weight and sets the switch 162 to approximate the proof of the alcohol which is to be consumed. The adjustment of the switches 162 and 172 controls the magnitude of the current which flows through a circuit including the electrochemical cells 100 and 102. The drinker now presses a button 174 which actuates all the switches 124, 126 and 128 to the position opposite to that shown in FIG. 3. At this time, the electrochemical cell 100 has some of the active material 110 transferred from the electrode 108 while the electrochemical cell 102 has active material 116 charged to the electrode 112. The circuit for the flow of the current includes the voltage source 164, the switch 172, the switch 162, one of the resistors 156, 158 and 160, through the switch 126, through the electrochemical cells 102 and 100, the switch 124 and a reference potential such as ground.

During this initial charge period, the electrochemical storage cell 104 does not receive any charge since there is no completed charge circuit for the storage cell 104. Specifically, the diode 134, although forward-biased, is not sufficiently forward-biased to pass a current through the electrolytic cell for transferring active material between the electrodes in the cell, and therefore no current flows through the electrochemical cell 104.

The button 174 is held down for a period of time equivalent to the quantity of the alcohol that is drunk. For example, in a particular example of the computer, the button 174 must be maintained in a down position 10 seconds for each ounce of alcohol. When the button 174 is released, all the switches assume the position shown in FIG. 3. At this time, the resistance across the electrochemical cells 100 and 102 is relatively low since both cells have active material on both electrodes within the cells.

When both cells 100 and 102 have active material on their two electrodes, the cells have relatively low resistances. Because of this, most of the voltage from the source 164 appears across the resistance 142 so that the transistor 130 is biased to a state of conductivity. This causes current to flow through a circuit including the voltage source 164, the meter 140 and the transistor 130. This current is at a level to produce an indication by the meter 140 of one-half of the peak value of the step function 20 in FIG. 2. The half-scale indication is produced since the value of the resistor 154 is predetermined to produce a current equal to one-half of the peak value of the step function 20 in FIG. 2. The half-scale indication on the meter 140 occurs immediately when the drinker has had at least one drink.

After the button 174 is released, current flows through the electrochemical storage cells 100 and 102 at a constant rate equivalent to a loss of alcohol from the blood at a rate equal to substantially 0.016% per hour, which rate is a constant for all people. Specifically, the current flows through the electrochemical storage elements 100 and 102 so as to transfer the active material in the electrochemical storage element 100 back toward the electrode 108, while the active material in the electrochemical storage element 102 is being transferred back to the electrode 114. The current flow is through a circuit including the voltage source 164, the resistance 152, the diode 134, the cells 100 and 102, the switch 126, the resistance 142 and the ground reference. If the drinker consumes no more alcohol, the electrochemical storage element 102 eventually becomes completely discharged. When this happens the resistance of the storage element 102 increases sufficiently so as to lower the current to an insignificant value. At the same time, the voltage across the resistance 142 decreases in view of the increased voltage drop across the cell 102. This causes the transistor 130 to become non-conductive, thereby discontinuing any current flow through the meter 140.

Assuming, however, that the drinker consumes repeated drinks, each time depressing the button 174 for the appropriate length of time, eventually the electrochemical storage element 100 becomes completely discharge of active material 110 from the electrode 108. This condition raises the resistance of the electrochemical element 100, thereby raising the voltage across the storage elements 100 and 102. The increase in voltage in turn increases the voltage at the diode 134 to turn on the diode 134. Therefore, as soon as the storage element 100 is completely discharged during the time that the button 174 is depressed, current flows through a circuit including the storage element 104, switches 172 and 162, one of the resistors 156, 158 or 160, the storage element 104, the diode 134 and the switch 124. This current causes active material in the storage element to be transferred from the electrode 120 to the electrode 118.

When the button 174 is released, the electrochemical storage element 100 is still completely discharged, thereby maintaining an increase in voltage across the element 100 and keeping the transistor 130 turned off. However, the transistor 132 is now turned on due to the decrease in resistance of the storage element 104 as a result of the existence of active material on both of the electrodes 118 and 120. A circuit is now completed to the meter 140 through the resistor 144 and the resistor 144 has a value of approximately one-half of the resistor 154 and the transistor 132 to ground. Since the meter 140 now reads full scale to indicate a state of drunkenness. The transistor 132 stays on until the active material on the electrode 118 in the electrochemical storage element 104 is completely transferred back to the electrode 120. This transfer occurs through a circuit which includes the voltage source 164, the resistance 152, the storage element 104 and the resistance 148. During the time that current flows trough this circuit, the impedance provided by the storage element 104 and the resistance 148 is considerably less than the impedance provided by the parallel circuit including the diode 134, the cells 100 and 102 and the resistance 142, particularly since the cell 100 has a relatively high impedance. This prevents current from flowing through the cells 100 and 102.

When all of the active material has been transferred from the electrode 118, the voltage increases across the storage element 104, thereby decreasing the voltage across the resistance 148 and turning the transistor 132 off. When the voltage increases across the storage element 104, the diode 134 is turned on, thereby switching back to the condition before the electrochemical storage element 100 was completely discharged and once more providing a current through the storage elements 100 and 102 for transferring active material to the electrode 108 in the storage element 100 and to the electrode 114 in the cell 102. As soon as some active material is transferred to the electrode 108 in the electrochemical storage element 100, the voltage across the storage elements 100 and 102 decreases, thereby turning on the transistor 130 and producing a half-scale indication in the meter 140.

It is to be appreciated that the particular embodiment of the invention shown in the drawings is illustrative only. For example, in the embodiment shown, the information fed to the storage device is in accordance with the quantity of alcohol consumed by the drinker, the proof of that alcohol and the weight of the drinker. The storage device may be fed information only in accordance with the total quantity of alcohol, which depends on both the proof of the alcohol and the quantity consumed by the drinker, but the storage device may have the information removed at a constant rate but with the constant rate varied in accordance with the weight of the drinker. It is to be appreciated that these variables may be shifted between the feeding and removing of the information without destroying the essential concept of the device.

The present invention provides for a drinking man's computer which indicates a state of drunkenness for a particular drinking man. The invention has been described with reference to a particular embodiment but it is to be appreciated that various adaptations and modifications may be made. For example, as used in the claims, the term "function" is intended to include the blood-alcohol content of a drinking man and is also intended to include any other situation where a value is increased at different intervals and is progressively decreased during the period of time between such different intervals. The invention, therefore, is only to be limited by the appended claims.

What is claimed is:

1. A computer for simulating a function having increases in value at different intervals and having progressive decreases in value during the periods of time between such different intervals, including:

a storage device including an electrolyte and a pair of electrodes and active material electrochemically transferable from either of the electrodes to the other electrode through the electrolyte and for initially storing a particular amount of the active material on a particular one of the electrodes, third means coupled to the storage device for obtainring the particular amount of the active material to the particular electrode in the storage device, second means coupled to the first means for obtaining a controlled transfer of a particular amount of the active material from the particular electrode to the other electrode in accordance with the increases in the value of the function at the different intervals, third means coupled to the storage device for obtaining a transfer of the active material from the other electrode to the particular electrode in the storage device at a predetermined rate related to the rate at which the function decreases in value during the periods of time between such different intervals, and fourth means coupled to the storage device for providing an indication when the active material has been completely transferred from the particular electrode in the storage device.

2. The computer of claim 1 wherein further means are responsive to the transfer of the active material from the particular electrode in the storage device for indicating when the relative value of the function exceeds on a simulated basis a particular level.

3. The computer of claim 1 wherein the function constitutes the alcohol in the bloodstream of a drinking man and wherein the increase in the value of the function results from the consumption of alcohol by the drinking man at the different intervals and wherein the second means for controlling the transfer of the active material from the particular electrode is adjustable in accordance with the proof of the alcohol and the weight of the drinking man.

4. The computer of claim 1 wherein the function constitutes the alcohol in the bloodstream of a drinking man and wherein the increased in the value of the function results from the consumption of alcohol by the drinking man at the different intervals and wherein the third means produces a transfer of the active material to the particular electrode at a rate equivalent to a dissipation of alcohol from the blood of approximately 0.016% per hour.

5. A drunkometer for simulating the percentage of alcohol in the bloodstream of a drinking man, including:

first means including an electrolyte and a pair of electrodes and an active material electrochemically transferable from either of the electrodes to the other through the electrolyte in representation of the relative percentage of alcohol at any time in the bloodstream of the drinking man, second means coupled to the first means for obtaining a controlled transfer of the active material from a particular one of the electrodes to the other electrode in the first means in accordance with the proof of the alcohol being consumed and the weight of the drinking man, third means coupled to the first means for obtaining a controlled transfer of the active material from the other electrode to the particular electrode, during the time that alcohol is not being consumed by the drinking man, at a rate corresponding to the rate at which alcohol is dissipated from the blood of the drinking man, and fourth means coupled to the first means for providing an output indication when all of the active material has been transferred from the particular electrode to the other electrode to indicate that the drinker is now drunk as represented by a concentration of alcohol in the blood of the drinker at a level greater than a particular level.

6. The computer of claim 5 wherein the first means for storing information includes a first electrochemical cell and wherein the fourth means includes a second electrochemical cell.

7. The computer of claim 6 wherein the second electrochemical cell includes an electrolyte and a pair of electrodes having active material electrochemically transferable from either of the electrodes to the other electrode through the electrlyte and wherein the third means is operative to transfer the active material from a particular one of the electrodes in the second cell to the other electrode in accordance with the consumption of alcohol at a level above that representing drunkenness and wherein the third means is further operative to transfer such active material from the other electrode to the particular electrode at a rate corresponding to the dissipation of alcohol from the blood of the drinker.

8. The computer of claim 7 wherein the fourth means includes means for indicating when the active material is initially transferred from the particular electrode to the other electrode in the second cell and is subsequently transferred from the other electrode to the particular electrode in the second cell.

9. A computer for simulating a function having increases in value at different intervals and having progressive decreases in value during the period of time between such different intervals, including:

a first electrochemical storage element including a pair of electrodes and an electrolyte and active material electrochemically transferable from either of the electrodes to the other electrode through the electrolyte, a particular one of the electrodes having a particular amount of active material representing a particular level for the function, a second electrochemical storage element including a pair of electrodes and an electrolyte and active material electrochemically transferable from either of the electrodes to the other electrode through the electrolyte, the second electrochemical storage element being connected to the first electrolytic storage element in opposed relationship, first means coupled to the first and second electrochemical storage elements for transferring a quantity of the active material from the particular electrode to the other electrode in the first storage element and for simultaneously transferring the same quantity of the active material from the other electrode to the particular electrode in the second storage element in accordance with increases in the value of the function at the different intervals, second means coupled to the first and second electrochemical storage elements for transferring the active material in the first electrochemical storage element at a predetermined rate from the other electrode to the particular electrode and for simultaneously transferring the active material in the second electrochemical storage element at the predetermined rate from the particular electrode to the other electrode during the periods of time between the different intervals, and third means coupled to the first and second electrochemical storage elements for producing an output indication when the particular amount of active material has been completely transferred by the first means from the particular electrode to the other electrode in the first electrochemical storage element.

10. The computer of claim 9 including an additional electrochemical storage element having electrolyte and a pair of electrodes and active material electrochemically transferable through the electrolyte from either of the electrodes to the other electrode and means connected to the first and second electrochemical storage elements and to the additional electrochemical storage element to transfer active material from the particular electrode to the other electrode in the additional electrochemical storage element when all of the active material has been transferred from the particular electrode to the other electrode in the first electrochemical storage element and to subsequently transfer the active material from the other electrode to the particular electrode in the additional electrochemical storage element.

11. The computer of claim 9 wherein the function constitutes the alcohol in the bloodstream of a drinking man and wherein the increase in the value of the function results from the consumption of alcohol by the drinking man at the different intervals and wherein the first means is adjustable to obtain a transfer of the active material in the second and first electrochemical storage elements in accordance with the proof of the alcohol and the weight of the drinking man.

12. The computer of claim 9 wherein the function constitutes the alcohol in the bloodstream of a drinking man and wherein the increase in the value of the function results from the consumption of alcohol by the drinking man at the different intervals and wherein the second means obtains a controlled transfer of the active material from the other electrode to the particular electrode in the first and third electrochemical storage elements in accordance with a dissipation of the alcohol from the bloodstream at a rate of substantially 0.016% per hour.

13. A computer for simulating a function having increases in value at different intervals and having progressive decreases in value during the periods of time between such different intervals, including:

first and second electrochemical storage elements in series opposing relationship, each storage element having electrolyte and a pair of electrodes and active material electrochemically transferable from either of the electrodes to the other electrode, a particular one of the electrodes in the first electrochemical storage element having a particular amount of active material representing a particular level of the function, first means coupled to the first and second electrochemical storage elements for transferring active material from the particular electrode to the other electrode in the first electrochemical storage element for each increase in the value of the function at the different intervals and for transferring the same quantity of active material from the other electrode to the particular electrode in the second electrochemical storage element, second means coupled to the first and second electrochemical storage elements for transferring active material from the other electrode to the particular electrode in the first electrochemical storage element and from the particular electrode to the other electrode in the second electrochemical storage element at a particular rate during the periods of time between the different intervals, and third means, including a third electrochemical storage element, coupled to the first and second electrochemical storage elements for producing an output indication when the particular amount of active material on the particular electrode in the first electrochemical storage element has been completely transferred to the other electrode in the first electrochemical storage element.

14. The computer of claim 13 wherein the third electrochemical storage element has electrolyte and a pair of electrodes and active material electrochemically transferable from either of the electrodes to the other electrode and wherein active material is on the particular electrode of the third electrochemical storage element and wherein the third means produces a transfer of the active material from the particular electrode to the other electrode.

15. The computer of claim 14 wherein the third means produces a first output indication when active material is transferred from the particular electrode to the other electrode in the third electrochemical storage element and produces a second output indication when the active material has been transferred from the other electrode to the particular electrode in the third electrochemical storage element.

16. The computer set forth in claim 15 wherein the third means interrupts the operation of the second means during the operation of the third means and wherein the second means resumes operation after the transfer by the third means of the active material from the other electrode to the particular electrode in the third electrochemical storage element.

17. A computer for simulating a function having increases in value at different intervals and having progressive decreases in value during the periods of time between such different intervals, including:

an electrochemical storage element having electrolyte and a pair of electrodes and active material electrochemically transferable from either of the electrodes to the other electrode, first means coupled to the electrochemical storage element for transferring active material from a particular one of the electrodes to the other electrode upon each increase in the value of the function at the different intervals, and second means coupled to the electrochemical storage element for transferring the active material from the other electrode to the particular electrode of the electrochemical storage element at a substantially constant rate during the periods of time between such different intervals.

References Cited

UNITED STATES PATENTS

| | | | |
|---|---|---|---|
| 3,222,654 | 12/1965 | Widrow et al. | 340—173 |
| 3,315,236 | 4/1967 | Hewlett | 340—173 |
| 3,354,439 | 11/1967 | Mitchell | 340—173 |
| 3,387,288 | 6/1968 | Bissett et al. | 340—173 |

EUGENE G. BOTZ, Primary Examiner

F. D. GRUBER, Assistant Examiner

U.S. Cl. X.R.

128—2.1; 204—195; 324—71; 340—173